(12) United States Patent
Brockhaus

(10) Patent No.: US 6,472,884 B1
(45) Date of Patent: Oct. 29, 2002

(54) ADAPTER CIRCUIT SYSTEM FOR A MEASURING DEVICE

(76) Inventor: Helmut Brockhaus, Sebastianstrasse 38, 46535 Dinslaken (DE)

( * ) Notice: Subject to any disclaimer, the term of this patent is extended or adjusted under 35 U.S.C. 154(b) by 99 days.

(21) Appl. No.: 09/675,126

(22) Filed: Sep. 28, 2000

(30) Foreign Application Priority Data

Oct. 4, 1999 (DE) .......................................... 199 47 698

(51) Int. Cl.$^7$ .............................................. H01H 31/02
(52) U.S. Cl. ...................................... 324/539; 323/901
(58) Field of Search ................................ 323/901, 908; 324/539; 320/139; 363/53, 89, 125

(56) References Cited

U.S. PATENT DOCUMENTS

| | | |
|---|---|---|
| 4,123,940 A | 11/1978 | Herzl et al. |
| 4,158,765 A | 6/1979 | Shauger et al. |
| 5,585,760 A | 12/1996 | Byford et al. |
| 5,973,942 A | * 10/1999 | Nelson et al. ............... 323/908 |

FOREIGN PATENT DOCUMENTS

DE  298 23 315  4/1999

* cited by examiner

*Primary Examiner*—N. Le
*Assistant Examiner*—Amy He

(57) ABSTRACT

An adapter circuit system for an electrically powered measuring device with two ports constituting a two-wire interface for connecting a dual-conductor cable capable both of feeding electric power to the measuring device and of transmitting a measuring signal from the measuring device for instance to an evaluation circuit. A second two-wire interface may be provided which permits the connection of a second cable capable of feeding additional electric power to the measuring device via two additional connecting ports. This permits universal operation of measuring devices equipped with the adapter circuit system due to the fact that in the event of increased power consumption by the measuring device, additional electric power can be supplied via the second two-wire interface.

9 Claims, 1 Drawing Sheet

ADAPTER CIRCUIT SYSTEM FOR A MEASURING DEVICE

FIELD OF THE INVENTION

This invention relates to an adapter circuit system for an electrically powered measuring device, with two connectors constituting a two-wire interface for connecting to a dual-conductor cable which serves to feed electric power to the measuring device while also permitting the transmission of a measuring signal for instance to an evaluation circuit.

BACKGROUND OF THE INVENTION

Dual-conductor adapter circuit systems are typically employed in such conventional measuring devices as suspended-particle flowmeters, eddy-frequency flowmeters, differential-pressure flowmeters and temperature sensors. What these measuring devices have in common is that for generating the physical measuring effect on which the operating principle of these measuring devices is based, no energy need be fed to drive the device. Hence, these measuring devices require an electrical cable only for supplying the power needed to detect the measuring effect and to transmit the measuring signal. The measuring signal is transmitted via the two-wire interface, with the measuring signal typically constituted of a current in the 4 to 20 mA range.

These measuring devices can operate with low voltages and currents and thus with a low electric output. In terms of any potentially necessary explosion-hazard protection, explosion-proof operation is possible within the "intrinsic safety" range of the spark-protection standard. The spark-protection standard specifies "intrinsic safety" as explosion protection which derives from the fact that even in the event of a short-circuit between the two conductors of the cable leading to the two-wire interface, no spark is generated that would be capable of triggering an explosion. This type of explosion protection can only be assured by limiting the overall available electric power.

In measuring devices which require electric power for achieving the measuring effect, for example magneto-inductive flowmeters, ultrasound flowmeters, Coriolis mass flowmeters and radar fill-level measuring devices, the use of a two-wire interface can lead to problems when operation within the "intrinsic-safety" standard is required. It strongly limits the electric power that can be transmitted to the measuring device. When the typical signal-current range of between 4 and 20 mA is employed, only 4 mA will be available for supplying power. As a result, measuring devices which for achieving the physical measuring effect require power, involve considerable performance compromises in the measuring operation. In particular, such measuring devices often have a poor signal-to-noise ratio and they respond only slowly to variations in the measured values due to the fact that with the low-level input power they can perform measurements only at extended time intervals.

The problem mentioned has so far been solved to a certain extent by improving the electronic components of the measuring devices in terms of their power consumption and of the signal-to-noise ratio. Operating such measuring devices with a two-wire interface has thus been basically possible and correspondingly designed devices are currently on the market. However, in terms of their application capabilities, these devices are severely limited especially due to the aforementioned sluggishness in tracking measuring values.

The measuring device of the design in question is preferably connected to "intrinsically safe cables". Of course, the term "intrinsically safe cables" is not intended to imply that the cables themselves are designed to be "intrinsically safe". Rather, "intrinsically safe cables" means that the cables are connected to an intrinsically safe power source or that at their input end, they are made "intrinsically safe" by means of appropriate circuitry, for instance by means of diodes.

SUMMARY OF THE INVENTION

It is the objective of this invention to provide an adapter circuit system and a measuring device incorporating such a system, so designed as to permit the universal use of the measuring device in a variety of measuring environments under diverse power input conditions.

According to the invention, the problem mentioned and identified above is solved by providing in an adapter circuit system of the general category in question, at least one additional port for connecting a second line which second line is capable of feeding additional power to the measuring device. The only constraint regarding this added power, supplied via the second cable, is that for operating within the "intrinsic safety" spark-protection mode, it is necessary to ensure compliance with the "intrinsic safety" spark-protection requirement. Therefore, according to this invention, it is possible depending on the intended application to use only one line or, should that much more power be required, to connect a second line.

The adapter circuit system according to this invention is preferably further enhanced by providing two ports which constitute a second two-wire interface for connecting the second, dual-conductor line. One advantage, inter alia, is the fact that the adapter circuit system can employ identical port types for the two-wire interfaces, for instance a particular male/female connector design, thus allowing for a degree of standardization of the adapter circuit system.

The measuring device is preferably equipped with a voltage regulator whose input end connects to the two dual-wire interfaces.

The current after the first two-wire interface and/or the current after the second two-wire interface can be individually limited, controlled or regulated. The current after the first two-wire interface and, respectively, the current after the second two-wire interface is in each case preferably controlled and/or regulated by a linear regulating transistor, i.e. each one such linear regulating transistor is connected in-line with the first and, respectively, the second two-wire interface. The first linear regulating transistor is preferably controlled from the voltage-regulator end or from the measuring device, and the second linear regulating transistor is preferably controlled by a special control circuit. The second linear regulating transistor is preferably controlled in such fashion as to provide for a constant current.

For rectifying an alternating-current voltage transmitted by way of the conductors leading to the first two-wire interface and/or transmitted by way of the conductors leading to the second two-wire interface, each one rectifier is preferably connected directly in-line with the first two-wire interface and/or directly in-line with the second two-wire interface. Any such rectifier is preferably a bridge-connected rectifier which in the case of a direct-current voltage transmitted via the cable leading to the first two-wire interface and, respectively, the cable leading to the second two-wire interface can also provide polarity protection. These rectifiers also serve the important protective function of preventing the reflux of electrical energy from the measuring device into the two-wire interfaces, thus ensuring the "intrinsic safety" of the "intrinsically safe cables".

A measuring device employing the adapter circuit system according to this invention is preferably so designed that the adapter circuit system is integrated directly into the measuring device. The connecting ports of the adapter circuit system are preferably integrated into the housing of the measuring device. It is thus possible for the adapter circuit system and the measuring device to be encapsulated so as to comply with the spark-protection standards relating to "enhanced safety", "potted encapsulation" or "pressure-resistant encapsulation".

In applying this invention, the user is thus able to operate the measuring device either as a 2-conductor measuring unit or as a 4-conductor measuring unit.

There are a number of different ways in which the adapter circuit system according to this invention can be designed and further enhanced. In this context, reference is made to the dependent patent claims as well as to the description of preferred design examples of this invention in conjunction with the diagrams, in which:

DETAILED DESCRIPTION OF THE PREFERRED EMBODIMENTS

Figure 1:
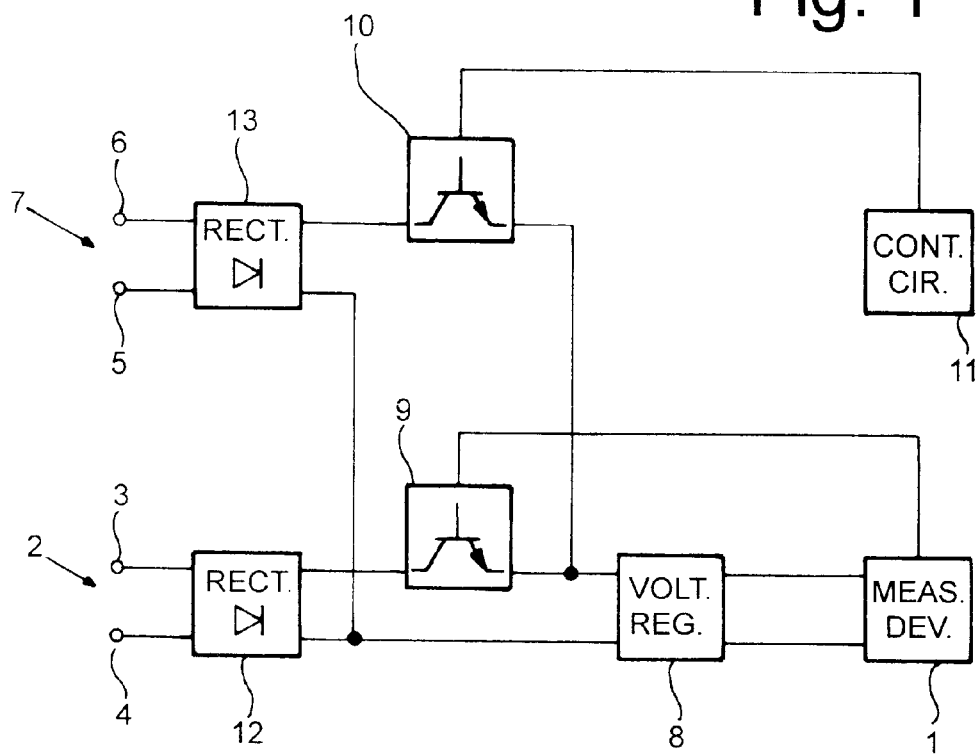
FIG. 1 is a schematic illustration of an adapter circuit system according to a first preferred embodiment of the invention.

FIG. 1 shows schematically an adapter circuit system according to a first preferred embodiment of this invention, for use with an electrically powered measuring device 1. The adapter circuit system is provided with a first two-wire interface 2 which essentially consists of two ports 3, 4 and by way of which electric power can be fed to the measuring device 1 while also being capable of transmitting measuring signals generated in the measuring device 1.

In addition to the first two-wire interface 2, a port 5 and a port 6 are provided which constitute a second two-wire interface 7. The use of this second two-wire interface 7 is optional and is needed only when more power must be fed to the measuring device 1 than would be possible by way of a line connecting to the first two-wire interface 2. According to the first preferred embodiment of the invention, the additional use of the second two-wire interface 7 makes it possible to feed in additional power of up to 400 mW.

As can be seen in FIG. 1, both the current fed to the port circuit by way of the first two-wire interface 2 and the current fed to the port circuit by way of the second two-wire interface 7 are channeled to the input end of a voltage regulator 8 dedicated and connected to the input of the measuring device 1. A first linear regulating transistor 9 is connected to the output end of the first two-wire interface 2 and a second linear regulating transistor 10 is connected to the output of the second two-wire interface 7. In the adapter circuit system according to the first preferred embodiment of this invention, the current emanating from the two-wire interface 2 is thus regulated by the linear regulating transistor which, on its part, is controlled by the measuring device 1. In contrast thereto, the current introduced via the two-wire interface 7 is controlled with the aid of the linear regulating transistor 10 which, on its part, is controlled by means of a control circuit 11. The control circuit 11 controlling the linear regulating transistor 10 sets the current, conducted from the second two-wire interface 7 to the input of the voltage regulator 8, at a fixed value.

As can also be seen in FIG. 1, a bridge-connected rectifier 12 is directly connected in series with the first two-wire interface 2 and a bridge-connected rectifier 13 is directly connected in series with the second two-wire interface 7. The bridge-connected rectifiers 12, 13 function as rectifiers when alternating current is fed through the line leading to the first two-wire interface 2 and, respectively, through the line leading to the second two-wire interface 7. When direct current is employed, i.e. when the line leading to the first two-wire interface 2 and, respectively, the line leading to the second two-wire interface 7 carries direct current, the bridge-connected rectifiers 12, 13 provide polarity protection.

Figure 2:
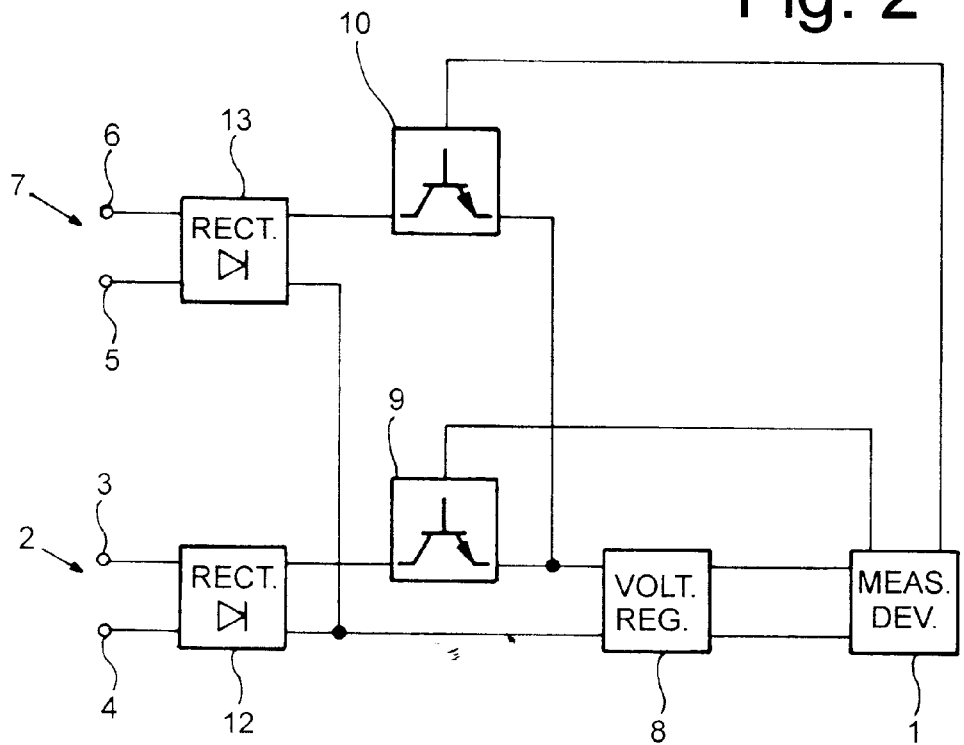
FIG. 2 is a schematic illustration of an adapter circuit system according to a second preferred embodiment of the invention.

FIG. 2 shows an adapter circuit system according to a second preferred embodiment of this invention. The configuration of the adapter circuit system illustrated in FIG. 2 for the second preferred embodiment of this invention differs from the adapter circuit system shown in FIG. 1 only insofar as the linear regulating transistor 10 connected in series with the second two-wire interface 7 is not controlled by the control circuit 11 but by the measuring device 1. Accordingly, in the second preferred embodiment of the invention both the first linear regulating transistor 9 and the second linear regulating transistor 10 are controlled by the measuring device, except that for both regulating units different control parameters can be selected.

FIGS. 1 and 2 do not make it evident that the adapter circuit system according to the preferred embodiments of the invention as described and illustrated is integrated into the measuring device 1. Such integration means that the adapter and control circuitry and the measuring device 1 constitute a single unit which makes it possible for instance to jointly encapsulate them so as to offer explosion protection. Nor is it shown in the figures that the ports 3, 4 of the first two-wire interface 2 and the ports 5, 6 of the second two-wire interface 7 are integrated into the housing of the measuring device 1. Such integration provides a secure, easily accessible location for the ports 3, 4 and 5, 6 and facilitates the optional activation of the second two-wire interface 7.

What is claimed is:

1. An adapter circuit system for an electrically powered measuring device, wherein two ports are provided constituting a two-wire interface for connecting a dual-conductor cable by way of which electric power is fed to the measuring device and a measuring signal from the measuring device is transmitted wherein at least one additional port is provided for connecting a second cable and wherein the said second cable allows the feeding of additional electric power to the measuring device.

2. The adapter circuit system as in claim 1, wherein two ports are provided, constituting a second two-wire interface for connecting a second dual-conductor cable.

3. The adapter circuit system as in claim 2, wherein the first two-wire interface and the second two-wire interface connect to a voltage regulator provided at the input of the measuring device.

4. The adapter circuit system as in claim 2 or 3, wherein the current emanating from the first two-wire interface and/or the current emanating from the second two-wire interface is limited.

5. The adapter circuit system as in claim 2 or 3, wherein the current emanating from the first two-wire interface is regulated by means of a first linear regulating transistor controlled by the voltage regulator or by the measuring device.

6. The adapter circuit system as in claim 2 or 3, wherein the current emanating from the second two-wire interface is regulated by means of a second linear regulating transistor controlled by a circuit.

7. The adapter circuit system as in claim 2 or 3, wherein the current emanating from the second two-wire interface is regulated by means of a second linear regulating transistor controlled by the voltage regulator or by the measuring device.

8. The adapter circuit system as in claim 2 or 3, wherein a rectifier is connected in series respectively with the first two-wire interface and/or the second two-wire interface.

9. A measuring device wherein two ports are provided constituting a two-wire interface for connecting a dual-conductor cable by way of which electric power is fed to the measuring device and a measuring signal is transmitted from the measuring device to an evaluation circuit, wherein at least one additional port is provided for connecting a second cable, the said second cable allowing the feeding of additional electric power to the measuring device, providing the possibility to either use the measuring device in an intrinsically safe mode by only using the said two ports of the two-wire interface or to use the measuring device in a non-intrinsically safe mode by using the said two ports of the two-wire interface and the said additional port to which the said second cable is connected.

* * * * *